US012045015B2

(12) United States Patent
Briscombe

(10) Patent No.: US 12,045,015 B2
(45) Date of Patent: Jul. 23, 2024

(54) AUTOMATIC WATCH ACCESSORY

(71) Applicant: Mark Briscombe, Cheshire (GB)

(72) Inventor: Mark Briscombe, Cheshire (GB)

(73) Assignee: Mark Briscombe, Cheshire (GB)

( * ) Notice: Subject to any disclaimer, the term of this patent is extended or adjusted under 35 U.S.C. 154(b) by 814 days.

(21) Appl. No.: 17/055,487

(22) PCT Filed: May 13, 2019

(86) PCT No.: PCT/GB2019/051302
§ 371 (c)(1),
(2) Date: Nov. 13, 2020

(87) PCT Pub. No.: WO2019/220085
PCT Pub. Date: Nov. 21, 2019

(65) Prior Publication Data

US 2021/0223739 A1 Jul. 22, 2021

(30) Foreign Application Priority Data

May 14, 2018 (GB) ...................................... 1807808

(51) Int. Cl.
*G04B 3/00* (2006.01)
*G04D 7/00* (2006.01)

(52) U.S. Cl.
CPC ............. *G04B 3/006* (2013.01); *G04D 7/009* (2013.01)

(58) Field of Classification Search
CPC ................................ G04B 3/006; G04D 7/009
USPC ............................................................ 81/7.5
See application file for complete search history.

(56) References Cited

U.S. PATENT DOCUMENTS

| | | | | |
|---|---|---|---|---|
| 2,841,978 | A | 7/1958 | Kohn | |
| 7,530,733 | B2 * | 5/2009 | Louie | G04D 7/009 81/7.5 |
| 8,668,379 | B2 * | 3/2014 | Nguyen | G04D 7/009 248/116 |
| 9,292,000 | B2 * | 3/2016 | Lamarche | G04B 5/00 |
| 2007/0159032 | A1 | 7/2007 | Louie | |
| 2009/0032478 | A1 | 2/2009 | Johnson et al. | |
| 2012/0201106 | A1 | 8/2012 | Nguyen et al. | |

FOREIGN PATENT DOCUMENTS

| | | | |
|---|---|---|---|
| CH | 614836 | A3 | 12/1979 |
| DE | 202007005506 | U1 | 7/2007 |
| DE | 202007006003 | U1 | 8/2007 |

(Continued)

OTHER PUBLICATIONS

PCT International Search Report and Written Opinion for International Application No. PCT/GB2019/051302, dated Aug. 5, 2019, 11 pages.

(Continued)

*Primary Examiner* — Hadi Shakeri
(74) *Attorney, Agent, or Firm* — Hoffman Warnick LLC

(57) ABSTRACT

An accessory (100) for an automatic watch (200) is provided. The accessory comprises a watch holder (120) carried by a first gimbal (130) in a manner to be rotatable about a first rotational axis A-A. The watch holder (120) is further rotatable about a second rotational axis B-B and rotation about the first rotational axis A-A and the second rotational axis B-B is caused by a first actuator (132) and a second actuator (122), respectively.

16 Claims, 3 Drawing Sheets

(56) References Cited

FOREIGN PATENT DOCUMENTS

| | | | |
|---|---|---|---|
| DE | 202008003821 | U1 | 5/2008 |
| FR | 1032822 | A | 7/1953 |
| JP | 2004212266 | A | 7/2004 |
| SU | 591805 | A1 | 2/1978 |
| WO | 2006050743 | A1 | 5/2006 |
| WO | 2014037294 | A1 | 3/2014 |

OTHER PUBLICATIONS

GB Patent Application No. 1807808.9 Search Report and Examination Report dated Nov. 30, 2018, 8 pages.

* cited by examiner

AUTOMATIC WATCH ACCESSORY

FIELD

The present disclosure relates in general to an accessory for automatic watches.

BACKGROUND

An automatic watch, such as an automatic wristwatch or an automatic pocket watch, is a timepiece powered by energy stored in a self-winding mechanical mechanism. Subjecting the automatic watch to a torque causes the self-winding mechanism to be actuated, thus storing additional energy, i.e. 'winding up' of the watch. Wearing the watch causes the self-winding mechanism to be actuated, whereas resting the watch would imply that no additional energy is stored so that ultimately the watch will stop. This is particularly a concern for automatic watches which are not worn regularly or, indeed, worn rarely such as pieces in a collection. After the watch stopped it is necessary to manually wind the watch, set the time and, where provided, set the calendar.

A watch-winding apparatus, or so-called watch winder, prevents an automatic watch from stopping by subjecting the watch to motion, thus actuating the self-winding mechanism. A particular example of a known watch winder is described in WO 2014/037294 A1. The known watch winder comprises a set of nested rings pivotally arranged relative to each other. A motor causes the outermost ring to rotate, which in turn causes the other rings to rotate in what is described as an essentially chaotic spinning motion to wind the watch mounted thereto.

The known watch winder does not, however, remove the need for setting an automatic watch carried therein. It is known that an automatic watch will accumulate a gain or a loss of time relative to the actual time. Already after a couple of weeks this gain or loss may become noticeable, amounting to a time difference of the order of minutes. Hence, despite the watch being kept from stopping, it will be necessary to again set the time for accurate timekeeping and, where required, the calendar.

Therefore, it is now desired to provide an accessory for an automatic watch which is configured to wind an automatic watch and reduce the need for setting the time kept by the automatic watch.

SUMMARY

According to the present disclosure there is provided an automatic watch accessory as set forth in the appended claims. Other features of the invention will be apparent from the dependent claims, and the description which follows.

According to some examples there may be provided an automatic watch accessory. The accessory may comprise a watch holder configured to receive an automatic watch. The accessory may also comprise a pair of actuators configured to rotate the watch holder. Using a first actuator of the pair, the watch holder may be rotatable about a first rotational axis. Using a second actuator of the pair, the watch holder may be rotatable about a second rotational axis. Thus an orientation of the watch holder may be adjusted, for example by rotation about the first rotational axis, and the watch holder may be rotated, for example about the second rotational axis. By suitably adjusting the orientation of the watch holder and, in use, the orientation of the automatic watch, a running speed of the automatic watch may be changed.

Through suitably orientating the watch holder, desynchronization, for example with respect to Standard Time, is therefore minimised.

For example, the accessory may be configured to maintain the watch holder in a particular orientation in which the rate of desynchronization, so called clock drift, is minimal or may alternatingly maintain the watch holder in a plurality of orientations in order to balance the watch running too fast against the watch running too slow.

An exemplary accessory for an automatic watch comprises a base; a first gimbal carried by the base and rotatable relative to the base about a first rotational axis; a watch holder carried by the first gimbal, the watch holder configured to receive an automatic watch; a first actuator configured to rotate the first gimbal about the first rotational axis; a second actuator configured to rotate the watch holder relative to the base about a second rotational axis to change an orientation of the watch holder.

According to some examples, the accessory comprises a sensing means configured to monitor the automatic watch.

According to some examples, the accessory comprises a controller. The controller may be configured to control the actuators to cause rotation. The controller may be configured to rotate the watch holder between a first orientation and a second orientation. According to some examples, the accessory comprises the controller and the sensing means.

Although the running speed of the automatic watch in various orientations may be determined beforehand and the accessory configured accordingly, it is envisaged that according to some examples the accessory comprises a sensing means to dynamically determine the running speed. Using the sensing means, a first running speed in a first orientation and a second running speed in a second orientation may be determined. For example, the controller may be suitably configured to monitor determine the running speed using the sensing means.

Where the first running speed is found to lower (or higher) than a reference running speed and the second running speed is found to higher (or lower) than the reference running speed, the accessory may maintain the watch holder alternatingly in both orientations in order to balance the first running speed against the second running speed. Thereby a faster running speed may be compensated with a slower running speed, and vice versa, to minimise clock drift.

Another exemplary accessory for an automatic watch accessory comprises a base; a first gimbal carried by the base and rotatable relative to the base about a first rotational axis; a watch holder carried by the first gimbal, the watch holder configured to receive an automatic watch; a sensing means configured to monitor a running speed of the automatic watch; a first actuation means configured to rotate the first gimbal about the first rotational axis; a second actuation means configured to rotate the watch holder relative to the base about a second rotational axis to change the first orientation to a second orientation; wherein the sensing means is configured to detect a first running speed when the watch holder is in the first orientation, the first running speed being lower than a reference running speed, and a second running speed when the watch holder is in the second orientation, the second running speed being higher than the reference running speed; and wherein the accessory is configured to alternatingly maintain the watch holder in the first orientation and the second orientation in order to minimise clock drift. For example, the controller may be suitably configured such that the watch holder is alternatingly maintained in the orientations.

Additionally or alternatively, clock drift may be minimised by maintaining the watch holder in a particular orientation, especially where it is determined that the automatic watch has a running speed in that orientation which is close to the reference running speed. Thus not only clock drift may be minimised, but also subjecting the automatic watch to motion may be reduced.

Accordingly, the sensing means may additionally or alternatively be configured to detect a third running speed when the watch holder is in a third orientation, wherein the first running speed is closer to the reference running speed than the third running speed; and wherein the accessory is configured to maintain the watch holder in the first orientation in order to minimise clock drift.

The running speed of the automatic watch may be monitored using any suitable means, such as optically monitoring movement of a hand or hands of the automatic watch. According to some examples, the monitoring comprises determining the frequency of so-called 'beats' of the automatic watch. The beats correspond to oscillations of an internal mechanical system of the automatic watch. The internal mechanical system, also known as the balance wheel, is configured to oscillate a whole integer number of times per second. For example, it may oscillate at 5, 6, 8 or 10 beats per second.

By detecting the frequency of beats, the sensing means may therefore be used to determine the running speed of the automatic watch. Accordingly, the sensing means may be configured to monitor beats of the automatic watch to determine the running speed of the automatic watch.

Another or further benefit of monitoring clock drift is that a change of clock drift over time can be determined. Where clock drift changes over time, particularly where it increases, this may indicate that the automatic watch needs to be serviced in order to prevent accumulation of excessive clock drift or, in certain cases, failure of the automatic watch. Using any suitable means, such an audible signal or a visual indication, the accessory may provide a notification thereto. A visual signal may be provided by means of, for example, a display.

Accordingly, the sensing means may be configured to detect a subsequent clock drift in the first orientation and compare the first clock drift to the subsequent clock drift, and the accessory is configured to generate a notification if the difference between the first clock drift and the subsequent clock drift is greater than a threshold value.

The sensing means may comprise a first sensor configured to detect the running speed of the automatic watch. The first sensor may be any sensor suitable sensor. For example, the first sensor may be an optical sensor configured to read movement of the hands of the automatic watch. Notably, even where movement of the seconds hand of the automatic watch may appear to the human eye as continuous, a suitable optical sensor can detect the discrete movements of the seconds hand corresponding to the 'beats'. According to other examples, the first sensor may be a microphone or a vibration sensor, e.g. a piezoelectric sensor. The vibration sensor may be configured to detect the vibrations caused as a result of internal events within the automatic watch. In particular, the vibration sensor may detect the 'beats' of the automatic watch. For improved accuracy, the vibration sensor may be located on the watch holder such that in use the automatic watch directly contacts the vibration sensor.

Accordingly, the first sensor may be a vibration sensor and may be configured to directly receive the automatic watch.

The sensing means may, additionally or alternatively, be configured to detect other internal events of the automatic watch. For example, the sensing means may be configured to detect the movement of a so-called slipping clutch. The slipping clutch is a mechanism by which 'overwinding' the self-winding mechanism powering the automatic watch is prevented and thus damage to said mechanism averted. Movement of the slipping clutch, however, may cause wear of the slipping clutch and also release oils or particulates within the automatic watch. It may therefore be considered beneficial to temporarily stop winding of the automatic watch and so prevent repeated movement of the slipping clutch. According to some examples, the accessory may be configured to cease rotation of the automatic watch for one to twelve hours in response to detection of movement of the slipping clutch.

Accordingly, the sensing means may be configured to monitor movement of a slipping clutch of the automatic watch, and wherein the accessory is configured to temporarily cease rotation of the watch holder when movement of the slipping clutch is detected.

The sensing means may additionally or alternatively be configured to monitor a time value of the automatic watch, i.e. the time kept by the watch. According to some examples, the sensing means comprises a second sensor configured to monitor the time value. The sensing means is configured to detect the time value, for example by reading the time displayed by the automatic watch. Through a comparison of the time value with a reference time, a clock offset is obtained. The clock offset quantifies the difference between the reference time, which is considered to be the 'actual' time, and the time kept by the automatic watch. In other words, clock offset quantifies how much a clock is desynchronised from the reference time, as opposed to clock drift which quantifies the rate at which the clock desynchronises. Utilising the difference in running speed between the first orientation and the second orientation, the accessory is configured to maintain the watch holder in the first orientation or the second orientation so as to minimise the clock offset. For example, the controller may be suitably configured such that the watch holder is maintained in the first orientation or the second orientation to minimise the clock offset.

Accordingly, the sensing means may be configured to determine a clock offset by comparing the time value with a reference time; wherein the accessory is configured to maintain the watch holder in the first orientation or in the second orientation to minimise clock offset.

Where the automatic watch is running behind, the accessory may maintain the automatic watch in the orientation in which the running speed is faster. That is to say, the accessory is configured to select the first orientation or the second orientation depending on which orientation results in the faster running speed. Conversely, where the time kept by the automatic watch is ahead of the reference time, the accessory maintains the automatic watch in the orientation in which the running speed which is slower.

Accordingly, the accessory may be configured to determine whether the time value is ahead of the reference time, and wherein the accessory may be configured to maintain the watch holder in the first orientation or the second orientation dependent on which orientation results in the slower running speed to minimise the clock offset if the time value is ahead of the reference time. Similarly, the accessory may be configured to determine whether the time value is behind the reference time, and wherein the accessory may be configured to maintain the watch holder in the first orientation or the second orientation dependent on which orientation results in the faster running speed to minimise the clock offset if the time value is behind the reference time.

The accessory may be provided with a reference time through any suitable means. For example, the accessory may comprise a timekeeping element configured to provide the reference time. The timekeeping element may comprise, for example, a quartz crystal or a GPS receiver. According to another example, the accessory may comprise a communication means configured to receive a time signal from a server, and the time signal contains the reference time. Such a time signal may be 'internet time'.

The second sensor may be an optical sensor.

According to some examples, the accessory is configured to generate and access a watch profile associated with the automatic watch 200. In particular, the watch profile may include a spatial map recording the running speeds in different orientations taken. Further, the spatial map may be updated with subsequently recorded running speeds per orientation. In some examples, the optical sensor is used to identify the automatic watch and access its particular watch profile.

According to some examples, the accessory comprises an orientation-sensing means. The orientation-sensing means is configured to sense a current orientation of the watch holder. Such orientation-sensing means may include the detection of an orientation indirectly, for example by determining the position of a stepper motor used as an actuator, or directly by means of an orientation sensor carried on the watch holder. The orientation sensor may be provided in the form of an accelerometer. An orientation sensor may be used in combination with motors which do not allow accurately determining the position of the motor.

According to some examples, the watch holder is manually detachable from the first gimbal. In other words, the watch holder is removably carried by the first gimbal. Conveniently this allows for removal of the watch holder and may ease fastening or unfastening of the automatic watch.

According to some examples, the accessory comprises a second gimbal rotatable about a third rotational axis and a third actuator configured to rotate the second gimbal to thereby rotate the watch holder about the third rotational axis and so change the orientation of the watch holder.

According to some examples, the first gimbal is an inner gimbal and the second gimbal is an outer gimbal, the outer gimbal being arranged about the inner gimbal and configured to carry the inner gimbal.

According to some examples, the third rotational axis and the first rotational axis are substantially perpendicular.

According to some examples, the first rotational axis and the second rotational axis are substantially perpendicular.

BRIEF DESCRIPTION OF DRAWINGS

For a better understanding of the invention, and to show how example embodiments may be carried into effect, reference will now be made to the accompanying drawings in which.

DESCRIPTION OF EMBODIMENTS

The present disclosure relates to an accessory for an automatic watch. The automatic watch is a self-winding mechanical watch, which may be provided as a wristwatch or a pocket watch.

Figure 1:
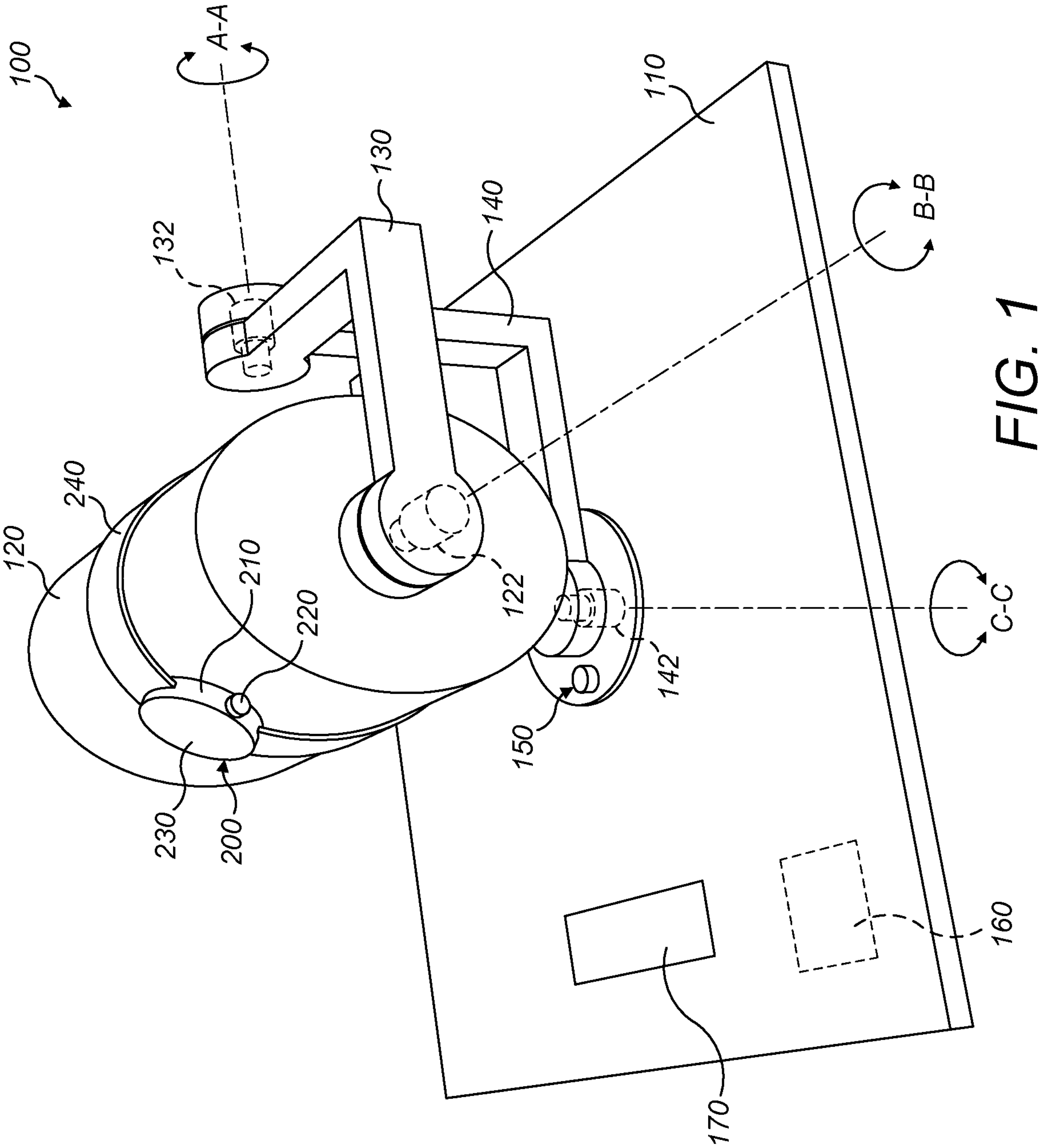
FIG. 1 shows a perspective view of an exemplary automatic watch accessory and an automatic watch.

FIG. 1 shows a perspective view of an exemplary accessory 100 according to the present disclosure and, secured thereto, an automatic watch 200. The present example is concerned with an automatic watch in the form of a wristwatch comprising a case 210, a crown 220 projecting from the case, a face 230, and a bracelet 240 attached to the case for securing the watch. In use, the accessory may be provided with a case or cover protecting the automatic watch. Such a case may be transparent to allow the watch to be seen.

The accessory 100 comprises a base 110. The base is a support carrying other portions of the accessory 100. In use, the base rests on a generally horizontal surface. According to the present example, the base is a generally rectangular and flat so that, when rested, the base is in a generally horizontal configuration.

The accessory 100 comprises a three-axis gimbal mounted to the base 110. The three-axis gimbal is a system of nested gimbals, i.e. pivotal supports, configured to subject the automatic watch 200 to rotations about three axes. The three-axis gimbal comprises a watch holder 120, an inner gimbal 130 and an outer gimbal 140 in a nested arrangement. The inner gimbal extends about the watch holder which is pivotally attached to the inner gimbal. The outer gimbal extends about the inner gimbal, thereby also about the watch holder, and the inner gimbal is pivotally attached to the outer gimbal. The outer gimbal is pivotally attached to the base 110.

The watch holder 120 is configured to receive and retain the watch 200. According to the present example, the watch is secured to the watch holder by means of the bracelet 240. That is to say, the watch is strapped around the watch holder and the bracelet then fastened. Suitably, the watch holder 120 is provided in an orientation considered convenient for attaching of the watch to the watch holder, removal therefrom, or generally for purposes of presentation. For example, the watch holder may be provided in the orientation shown in FIG. 1, in which the watch holder is generally parallel to the base 110, while the case 210 of the watch 200, when secured thereto, is provided at an angle of approximately 45° (degrees of an angle) relative to the base 110 so that the face 240 of the automatic watch points generally upwards, i.e. away from the base. This orientation may correspond to a default orientation to which the accessory 100 returns.

The inner gimbal 130 (or 'first gimbal') is rotatable relative to the base 110 about a first rotational axis A-A and configured to carry, i.e. support, the watch holder 120. A first actuator 132 (or 'actuator means') is provided to cause rotation of the inner gimbal 130 about the first rotational axis A-A. As the watch holder is carried by the inner gimbal, rotation of the inner gimbal causes rotation of the watch holder about the first rotational axis A-A.

A second actuator 122 is provided to cause rotation of the watch holder 120 about a second rotational axis B-B. Given that the watch holder is rotatable about the second rotational axis B-B, the watch holder is a gimbal. The second rotational axis B-B is non-parallel to the first rotational axis A-A and, according to the present example, is substantially perpendicular to the first rotational axis A-A. Accordingly, the inner gimbal 130 is curved suitably to receive the first actuator 132 along the first rotational axis A-A and the second actuator 122 along the second rotational axis B-B. According to the present example, the inner gimbal is curved into an L-shape so as to receive both actuators along their respective rotational axes.

The second gimbal 140 (or 'outer gimbal') is rotatable relative to the base 110 about a third rotational axis C-C and configured to carry the inner gimbal 130 and, thus, also the watch holder 120. A third actuator 142 is provided to cause rotation of the second gimbal 140 about a third rotational axis C-C. The third rotational axis C-C is nonparallel to the first rotational axis A-A and, according to the present example, is substantially perpendicular to the first rotational axis A-A. Similar to how the inner gimbal is arranged, the second gimbal is suitably curved so as to receive the first actuator along the first rotational axis A-A and the third actuator along the third rotational axis B-B. According to the present example, the second gimbal is curved into an L-shape similar to that of the inner gimbal but larger.

The actuators 122, 132, 142 provide independent actuation means. That is to say, rotation about one of the rotational axes may be initiated, maintained or stopped independently of rotation about the other rotational axis. By causing rotation of the watch holder 120 about one or multiple rotational axes, the watch holder may be brought from a first orientation to a second orientation. By changing the orientation of the automatic watch 200, a running speed of the automatic watch may be changed. Mechanical watches, such as the automatic watch 200, are known to possess a variable running speed which depends on the orientation in which the watch is held. For example, the automatic watch 200 may run faster when held, say, so that the face 230 points upwards and slower when held so that face 230 points downwards. Furthermore, mechanical watches are known to possess running speeds which may not accurately correspond to the running speed of a standardised reference clock, such as the internationally recognised unit of seconds. Therefore, over time an increasingly large difference between mechanical watches and the reference clock is accumulated. This difference, which results in a loss or gain relative to the reference clock, is also referred to as clock drift. Known mechanical watches may possess a clock drift between 1 to 10 seconds per day. Such clock drift results in desynchronization, i.e. divergence between the time kept by the watch and an intended time.

Accordingly, the accessory 100 is configured to retain the automatic watch 200 in an orientation in which clock drift is reduced or alternate through a set of orientations to reduce clock drift and, additionally or alternatively, wind the automatic watch. The particular orientation or set of orientations may be known, for example, from the watchmaker and the accessory configured accordingly. However, according to the present example, the accessory comprises means for detecting the running speed of the automatic watch in different orientations and subsequently selects an orientation in which clock drift is minimised or alternates through a set of orientations to reduce clock drift.

Figure 2:
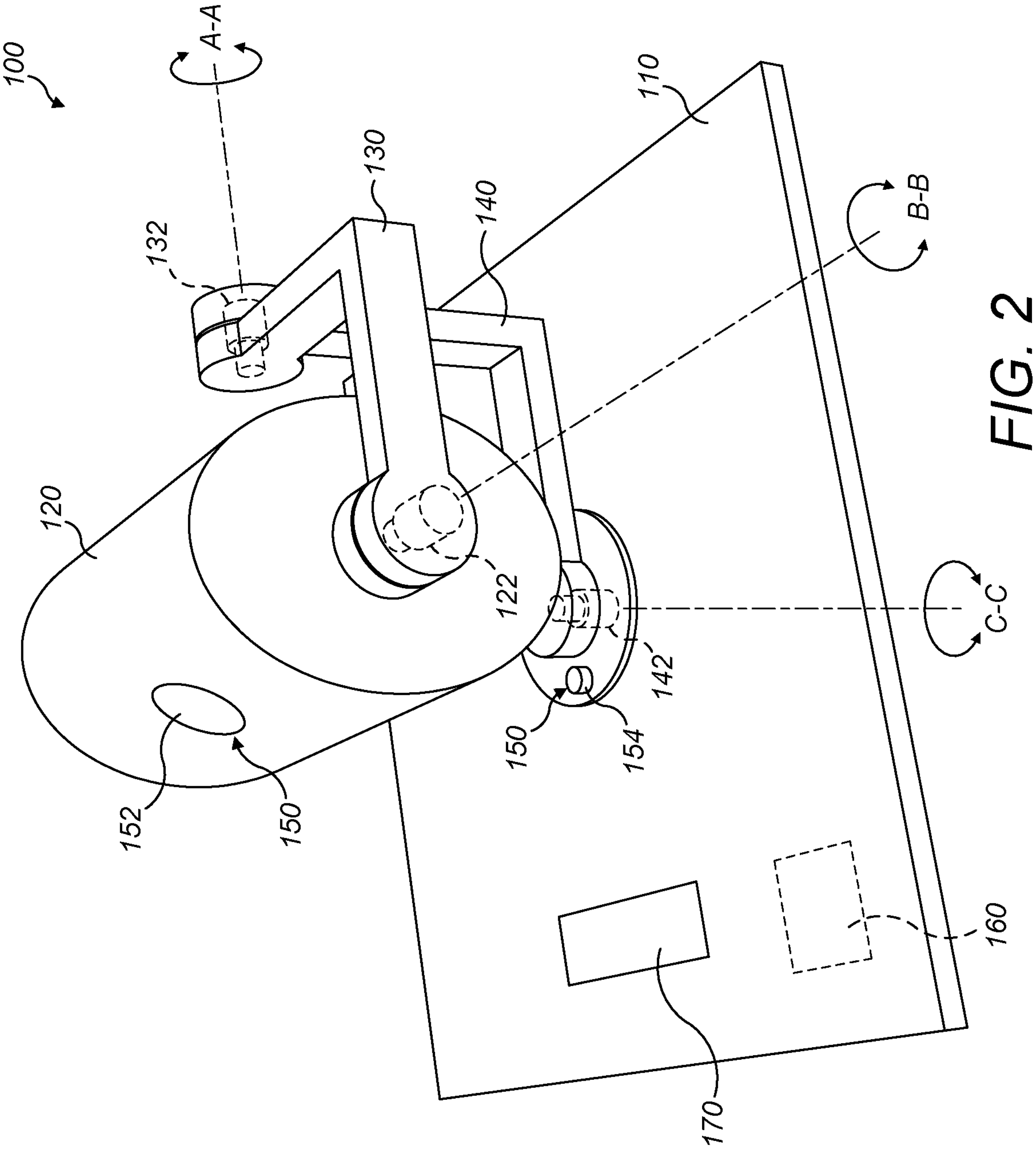
FIG. 2 shows a perspective view of the exemplary automatic watch accessory.

FIG. 2 shows the accessory 100 without the automatic watch 200 secured thereto.

The accessory 100 comprises a sensing means 150 comprising a first sensor 152.

The first sensor 152 is carried by the watch holder 120 and is configured to monitor a running speed of the automatic watch 200. Given that the automatic watch 200 possesses different running speeds dependent on the orientation in which it is provided, the first sensor is configured to record a first running speed when the watch holder 120 is in the first orientation and a second running speed when the watch holder is in the second orientation. By comparing the running speeds of the automatic watch with a reference running speed of a standardised reference clock, it is determined whether the first running speed or the second running speed is closer to the reference running speed. In order to minimise clock drift, therefore, the accessory 100 maintains the watch holder in the orientation associated with the smaller clock drift.

Where at least one running speed is determined to be faster than the reference running speed and at least one running speed is determined to be slower than the reference running speed, the accessory maintains the watch holder alternatingly in the orientations associated with the slow running speed and the fast running speed to minimise clock drift. Thereby the accumulation of a time difference may be prevented or at least reduced. Contemporaneously the accessory may rotate the watch holder to wind the automatic watch 200 continuously or intermittently.

The first sensor 152 is further configured to record subsequent running speeds in the different orientations. Where the running speed in a given orientation is found to change over time, this may be an indication that the automatic watch 200 may need to be serviced. Accordingly, the accessory 100 is configured to compare the first running speed recorded at a first time in a given orientation with the subsequent running speed recorded at a second time, which is after the first time, in the same orientation. For example, a watch profile containing this information may be maintained by the accessory. Where the difference between the first running speed and the subsequent running speed exceeds a threshold value, the accessory informs that servicing of the automatic watch 200 is suggested. It is envisaged that the accessory may inform through a readable notification and/or an audible notification. Such notifications may be generated by means provided on the accessory, such as a display 170, or, for example, an external electronic device communicating with the accessory.

According to the present example, the first sensor 152 is configured to monitor so-called beats of the automatic watch 200 in order to determine the running speed of the automatic watch. The beats correspond to internal events of the mechanism within the watch. In particular, the oscillation of the balance wheel may generate beats of 6, 8 or 10 Hz (Hertz). As a result of the oscillation of the balance wheel, vibrations are caused and the first sensor is configured to detect said vibrations. According to the present example, therefore, the first sensor is a vibration sensor located on the watch holder 120 and directly received the automatic watch.

The first sensor 152 is further configured to detect the movement of a slipping clutch of the automatic watch 200. The slipping clutch moves or 'slips' in order to prevent damage to the internal mechanism of the watch as a result of 'overwinding'. Movement of the slipping clutch, however, is a mechanical process causing wear to the clutch mechanism and releases particulates and oil within the casing 210, thus possibly affecting other portions within the casing as well. Accordingly, the accessory 100 is configured to temporarily cease rotating the watch holder 120 when movement of the slipping clutch is detected, as this indicates that a maximal amount of energy is stored in the watch and further rotating is to be avoided.

Figure 3:
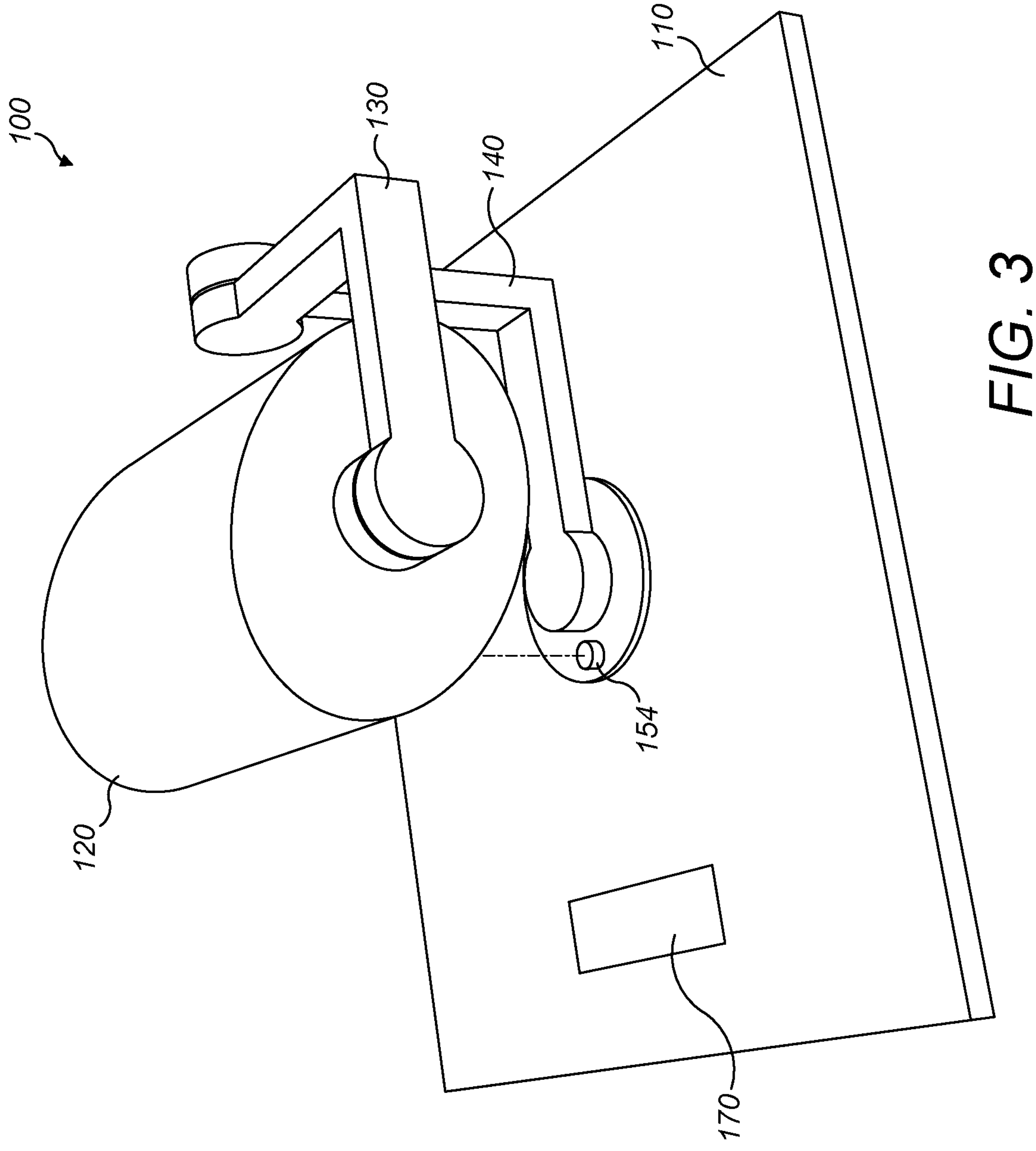
FIG. 3 shows a perspective view of the exemplary automatic watch accessory in a different configuration.

FIG. 3 is a perspective view of the accessory 100 in a readout orientation.

The sensing means 150 comprises a second sensor 154. The second sensor is configured to monitor a time value of the automatic watch 200, i.e. read the time kept by the automatic watch. By comparing the time value of the automatic watch with a reference time kept by the reference clock, a clock offset is determined. That is to say, it is determined by how much the automatic watch is desynchronised from the reference time; by contrast, the clock drift relates to how quickly the automatic watch desynchronises. According to the present example, the reference time (or 'correct' time) is supplied by a timekeeping element provided within the accessory.

Clock offset may be minimised by maintaining the watch holder 120 in the first orientation or in the second orientation, depending on the running speed associated with these orientations and, hence, the clock drift of these orientations. Thus clock drift is utilised to synchronise the automatic watch with the reference clock. Throughout the accessory 100 may rotate the watch holder in order to wind the automatic watch continuously or intermittently.

Where the automatic watch has been determined to be behind the reference clock, maintaining the automatic watch in an orientation in which the watch possesses a running speed which is higher than the running speed of the reference clock reduces the clock offset. Synchronisation of the watch, i.e. reduction of clock offset to within a tolerance considered acceptable, may be fastened by selecting the orientation in which the running speed of the watch is highest.

Conversely, where the automatic watch is ahead of the reference clock, maintaining the automatic watch in an orientation in which the watch possesses a running speed which is lower than the running speed of the reference clock reduces the clock offset. Synchronisation of the watch may be fastened by maintaining the watch in the orientation in which the running speed of the watch is lowest.

According to the present example, the accessory 100 comprises an orientation-sensing means and is configured to map sensed running speeds to the corresponding orientations sensed by the orientation-sensing means. Thereby a spatial map associating orientations of the watch and the associated the running speed is generated.

Where the clock offset has been reduced to within an acceptable tolerance, the accessory 100 maintains the watch holder in the orientation which minimises clock drift or alternates through the set of orientations which in combination minimises clock drift. That is to say, the accessory 100 first brings the automatic watch to an accurate time and then prevents the watch from desynchronising. Eventually, however, it may be necessary to again synchronise the automatic watch where the clock offset accumulates above a particular value.

The second sensor 154 is provided in the form of an optical sensor and configured to 'read' the time kept by the automatic watch 200. According to the present example, the second sensor is carried on the base 110 and pointed towards the watch holder 120. In order to read the time value displayed by the automatic watch, the watch holder is suitably adjusted to a readout orientation in which the face of the automatic watch points towards the second sensor.

There is now described an example operation of the accessory 100. An operator of the accessory 100 secures the automatic watch 200 to the watch holder 120 with the watch holder provided in the default orientation. Switching on the accessory causes the accessory to subject the watch to rotations. Moreover, the accessory is configured to adapt the orientation in which the watch is held in response to feedback obtained through monitoring of the watch.

The accessory 100 rotates the automatic watch 200 in order to actuate the self-winding mechanism contained therein. According to the present example, the watch holder 120 is subjected to rotations about the first rotational axis A-A. Whilst the automatic watch is being rotated, the first sensor 152 monitors the running speed of the watch and monitors for movement of the slipping clutch.

A controller unit 160 receives the sensor readouts from the first sensor 152 and compares the running speed of the automatic watch 200 to the reference running speed.

The accessory 100 proceeds by adjusting the default orientation to a second orientation. The orientation of the watch holder may be changed by actuating the second actuator 122 or the third actuator 142. For example, the watch holder may be brought from the default orientation to the readout orientation. That is, the watch holder is rotated by approximately 90° (degrees of an angle) about the second rotational axis B-B, so that the watch holder is inclined at an angle of approximately 45° and the face 230 of the automatic watch generally points towards the base, i.e. downwards. Rotation about the first rotational axis A-A may be maintained as the orientation is changed.

In the readout orientation, the second sensor 154 monitors and transmits a time value to the controller unit 160 which compares the time value to the reference time value. Moreover, the first sensor 152 continues to monitor the running speed of the automatic watch, and continues to monitor for movement of the slipping clutch. The controller compares a second running speed of the automatic watch to the reference running speed.

By selecting the default orientation or the readout orientation, the accessory 100 modifies the running speed of the automatic watch. Such selecting is dependent on how the time value of the automatic watch compares to the reference time value, and how the first running speed and the second running speed compare to the reference running speed.

Where it is determined that there is a clock offset, the accessory utilises clock drift in order to minimise the clock offset. Subsequently, the accessory minimises clock drift in order to maintain the automatic watch at an accurate time. Throughout, the accessory winds the automatic watch unless movement of the slipping clutch is registered, in response to which winding is temporarily interrupted.

Each actuator 122, 132, 142 may be capable of unidirectional rotation only or bidirectional rotation. A unidirectional actuator can only be actuated to rotate in a given direction. By contrast, a bidirectional actuator can be actuated to rotate in one direction or, alternatively, in the other direction. According to the present example, the actuators 122, 132, 142 are provided as electric motors but suitable alternatives may be used.

In summary, exemplary embodiments of an automatic watch accessory have been described. The described exemplary embodiment is convenient to manufacture and straightforward to use. Moreover, the automatic watch accessory may be manufactured industrially. An industrial application of the example embodiments will be clear from the discussion herein.

Although preferred embodiment(s) of the present invention have been shown and described, it will be appreciated by those skilled in the art that changes may be made without departing from the scope of the invention as defined in the claims.

The invention claimed is:

1. An automatic watch accessory (100), the accessory (100) comprising:

a base (110);

a first gimbal (130) carried by the base (110) and rotatable relative to the base (110) about a first rotational axis (A-A);

a watch holder (120) carried by the first gimbal (130), the watch holder (120) configured to receive an automatic watch (200);

a plurality of independent actuators comprising a first actuator and a second actuator, the first actuator (132) configured to rotate the first gimbal (130) about the first rotational axis; and the second actuator (122) configured to rotate the watch holder (120) relative to the base (110) about a second rotational axis (B-B) to change an orientation of the watch holder (120); and a sensing means (150) configured to monitor the automatic watch (200), and a controller (160) configured to rotate the watch holder (120) between a first orientation and a second orientation, wherein the sensing means (150) is configured to monitor a running speed of the automatic watch (200) to detect:

a first running speed of the automatic watch (200) when the watch holder (120) is in the first orientation, the first running speed being lower than a reference running speed, and a second running speed of the automatic watch (200) when the watch holder (120) is in the second orientation, the second running speed being higher than the reference running speed;

wherein the controller (160) is configured to alternatingly maintain the watch holder (120) in the first orientation and the second orientation in order to minimise clock drift.

2. The accessory (100) according to claim 1, wherein the sensing means (150) is configured to record a subsequent running speed in the first orientation, and the controller (160) is configured to compare the first running speed with the subsequent running speed and to generate a notification if the difference between the first running speed and the subsequent running speed is greater than a threshold value.

3. The accessory (100) according to claim 1, wherein the sensing means (150) is configured to monitor beats of the automatic watch (200) to determine the running speed of the automatic watch (200).

4. The accessory (100) according to claim 1, the sensing means (150) further comprising a vibration sensor located on the watch holder (120), wherein the vibration sensor is configured to directly receive the automatic watch (200).

5. The accessory (100) according to claim 4, wherein the vibration sensor is configured to monitor movement of a slipping clutch of the automatic watch (200), and wherein the controller (160) is configured to temporarily cease rotation of the watch holder (120) when movement of the slipping clutch is detected.

6. The accessory (100) according to claim 1, wherein the sensing means (150) is configured to monitor a time value of the automatic watch (200), and the accessory (100) is configured to compare the time value with a reference time to determine a clock offset; and wherein the controller (160) is configured to maintain the watch holder (120) either in the first orientation or in the second orientation to minimise the clock offset.

7. The accessory (100) according to claim 6, wherein the controller (160) is configured to determine whether the time value is ahead of the reference time, and wherein the controller (160) is configured to maintain the watch holder (120) in the first orientation if the time value is ahead of the reference time to minimise the clock offset, and in the second orientation if the time value is behind the reference time.

8. The accessory (100) according to claim 6, the accessory (100) comprising a timekeeping element configured to provide the reference time.

9. The accessory (100) according to claim 1, wherein the sensing means (150) comprises an optical sensor (154).

10. The accessory (100) according to claim 9, wherein the controller (160) is configured to identify the automatic watch (200) using the optical sensor and access a corresponding watch profile, wherein the watch profile comprises records of running speeds of the automatic watch (200) in different orientations.

11. The accessory (100) according to claim 1, further comprising a second gimbal rotatable about a third rotational axis, wherein the plurality of independent actuators further comprises a third actuator configured to rotate the second gimbal to thereby rotate the watch holder (120) about the third rotational axis and so change the orientation of the watch holder (120).

12. The accessory (100) according to claim 1, wherein the accessory (100) comprises an orientation sensor configured to sense an orientation of the watch holder (120).

13. The accessory (100) according to claim 1, wherein the watch holder (120) is manually detachable from the first gimbal (130).

14. An automatic watch accessory (100), the accessory (100) comprising:

a base (110);

a first gimbal (130) carried by the base (110) and rotatable relative to the base (110) about a first rotational axis (A-A);

a watch holder (120) carried by the first gimbal (130), the watch holder (120) configured to receive an automatic watch (200);

a plurality of independent actuators comprising a first actuator and a second actuator, the first actuator (132) configured to rotate the first gimbal (130) about the first rotational axis; and the second actuator (122) configured to rotate the watch holder (120) relative to the base (110) about a second rotational axis (B-B) to change an orientation of the watch holder (120); and a sensing means (150) configured to monitor the automatic watch (200), and a controller (160) configured to rotate the watch holder (120) between a first orientation and a second orientation, wherein the sensing means (150) is configured to monitor a time value of the automatic watch (200), and the accessory (100) is configured to compare the time value with a reference time to determine a clock offset; and wherein the controller (160) is configured to maintain the watch holder (120) either in the first orientation or in the second orientation to minimise the clock offset.

15. The accessory (100) according to claim 14, wherein the controller (160) is configured to determine whether the time value is ahead of the reference time, and wherein the controller (160) is configured to maintain the watch holder (120) in the first orientation if the time value is ahead of the reference time to minimise the clock offset, and in the second orientation if the time value is behind the reference time.

16. The accessory (100) according to claim 14, the accessory (100) comprising a timekeeping element configured to provide the reference time.

* * * * *